United States Patent [19]

Thorsrud

[11] Patent Number: 4,734,307

[45] Date of Patent: Mar. 29, 1988

[54] COMPOSITIONS WITH ADHESION PROMOTOR AND METHOD FOR PRODUCTION OF FLOCKED ARTICLES

[75] Inventor: Agmund K. Thorsrud, Bartlesville, Okla.

[73] Assignee: Phillips Petroleum Company, Bartlesville, Okla.

[21] Appl. No.: 682,027

[22] Filed: Dec. 14, 1984

[51] Int. Cl.⁴ .......................... B05D 1/14; B05D 1/16; B32B 33/00

[52] U.S. Cl. .......................... 428/90; 427/206; 428/95; 428/96; 428/97

[58] Field of Search .......................... 428/90, 95, 96, 97; 427/206

[56] References Cited

U.S. PATENT DOCUMENTS

| | | | |
|---|---|---|---|
| 3,498,816 | 3/1970 | Finch | 117/17 |
| 3,887,737 | 6/1975 | Baxter | 428/90 |
| 3,896,802 | 7/1975 | Williams | 128/156 |
| 3,903,331 | 9/1975 | Klein | 427/206 |
| 3,922,410 | 11/1975 | Halloran | 428/88 |
| 3,943,018 | 3/1976 | Petry | 156/79 |
| 3,961,116 | 6/1976 | Klein | 428/90 |
| 3,993,806 | 11/1976 | Athey | 427/206 |
| 4,122,219 | 10/1978 | Fickelson | 427/206 |
| 4,180,606 | 12/1979 | Hance | 428/88 |
| 4,218,501 | 8/1980 | Kameya | 428/90 |
| 4,241,122 | 12/1980 | Asano | 428/90 |
| 4,246,308 | 1/1981 | Walsh | 428/88 |
| 4,288,499 | 9/1981 | Klelbania | 428/518 |
| 4,293,604 | 10/1981 | Campbell | 428/90 |
| 4,350,788 | 9/1982 | Shimokawa | 524/309 |
| 4,361,609 | 11/1982 | Gerlach | 428/90 |
| 4,424,240 | 1/1984 | Klelbania | 428/515 |

OTHER PUBLICATIONS

Polymer Science and Technology, vol. 9B, pp. 452, 454–459, Plenum Presss, 1975.

Bonded Fabrics, J. R. Holker, pp. 18–25, Merrow Publishing Co., Ltd., 1975.

*Primary Examiner*—Marion C. McCamish
*Attorney, Agent, or Firm*—S. E. Reiter

[57] ABSTRACT

Method and composition useful for improving the adhesion of flock to substrate in flocked articles are provided.

24 Claims, No Drawings

COMPOSITIONS WITH ADHESION PROMOTOR AND METHOD FOR PRODUCTION OF FLOCKED ARTICLES

BACKGROUND

This invention relates to flocked articles. The invention also relates to a method for the production of flocked articles. In another aspect, the invention relates to novel compositions employed in the production of flocked articles.

Flocked articles, in which piles are flocked on an adhesively coated substrate, such as for example fabric, are well known in the art. A problem frequently encountered with flocked articles is the low degree of adhesion of the flock material to the adhesively coated substrate. In addition, flocked articles also frequently suffer from poor durability, in that the desired properties of the flocked article are not retained over an extended period of time.

OBJECTS OF THE INVENTION

It is therefore an object of the invention to provide flocked articles wherein the flock material displays improved adhesion to an adhesively coated substrate.

Another object of the invention is a method for improving the adhesion of flock material to an adhesively costed substrate.

These and other objects of the invention will become apparent from inspection of the disclosure and appended claims.

STATEMENT OF THE INVENTION

In accordance with the present invention, I have discovered that the adhesion of flock to an adhesive coated surface is surprisingly improved and a denser coverage of flock on the substrate surface is obtained by adding at least one adhesion improving additive selected from a defined group to the adhesive before flock is applied to the adhesive coated surface.

DETAILED DESCRIPTION OF THE INVENTION

In accordance with one embodiment of the present invention, a method is provided comprising flocking an adhesive coated substrate with short fibers wherein at least one adhesion improving additive selected from a defined group is added to the adhesive to enhance the adhesion of fibers to the flocked article. Following optional heat treatment at about 100° up to about 300° F., the supported flock displays enhanced adhesion and durability compared to prior art supported flock.

In accordance with another embodiment of the invention, flocked articles are provided.

In accordance with yet another embodiment of the invention, compositions are provided comprising an adhesive and at least one adhesion improving additive.

In accordance with a further embodiment of the invention, a method is provided to improve the adhesion between a latex ahesive and short fibers comprising adding to the latex adhesive at least one adhesion improving additive selected from a defined group.

Flock

"Flock" is defined for purposes of the present invention as short fibers. The fibers may be prepared from such natural materials as wool, linen and cotton as well as from synthetic materials such as for example, viscose rayon, cellulose acetates, polyesters, polyamides, polyolefins, acrylonitrile polymers, and the like. The preferred flocks for use in the practice of the present invention are polyolefin flocks, especially polymers of olefins containing about 2 to about 8 carbon atoms, preferably 2 to about 5 carbon atoms. Most preferably, polymers of olefins containing 3 carbon atoms, i.e., polypropylene, will be employed into practice of the present invention.

The flock fibers employed in the invention can be precision cut to exact length or chopped to produce random fiber lengths. Although suitable fiber lengths for a particular application can be readily determined by one skilled in the art, the following ranges are suggested to provide additional guidance. Broadly, fiber lengths of about 0.2 to about 20 millimeters will be employed. Preferably, a fiber length of about 0.2 up to about 7 millimeters will be employed, with a fiber length of about 0.2 up to about 4 millimeters being most preferred.

It is within the scope of my invention to pretreat the flock fibers as known in the art prior to contacting the adhesive coated substrate surface with the flock. Such pretreatment serves to further enhance the adhesion of flock to the adhesively coated substrate surface. Examples of oxidixing pretreatments useful in the practice of the invention are contact with fluorine gas (preferably diluted by an inert gas), contact with aqueous solutions of oxidizing agents such as for example potassium bromate, zinc nitrate and the like. Flock pretreatment has been found to be especially beneficial with polyolefin flock material.

Flocking Procedure

Flocking the fibers onto the adhesive coated substrate can be achieved by any suitable means, such as for example, electrostatic or mechanical means as known to those skilled in the art. Generally, whatever the means employed, the process comprises depositing a mass of finely cut fibers onto the adhesively coated substrate and causing them to adhere thereto. The main types of suitable flocking procedures include (1) a mechanical process comprising spraying the fibers onto the adhesively coated substrate, (2) a further mechanical process comprising sifting the fibers onto the adhesive coated substrate and vibrating the substrate by the action of beater bars to cause the fibers to stand erect and penetrate the adhesive, and (3) an electrostatic process in which the lines of force of an electrostatic field are used to propel and guide the fibers from a hopper onto the adhesively coated substrate. In addition, combinations of electrostatic and mechanical processes may be employed.

In the first or mechanical process, compressed air is generally used to bring the fibers into contact with the adhesive. In the second or mechanical flocking process, the reverse side of the adhesive coated substrate is beaten by multi-sided bars known as beater bars. As the flock is sifted onto the adhesive coating, the vibrations set up by the beater bars fluidize the flock causing it to flow over the surface of the substrate. Initially, the fibers fall on the adhesive in random orientation. The vibration is able to stand erect those fibers that do not land flat against the adhesive. Once erect and vibrated, the fibers have an increased tendency to penetrate fully in the adhesive. As the number of erect fibers increases, the free fibers tend to align themselves with the erect cover and work down to the adhesive under the influence of the vibrating action. Thereafter, the amount of oriented fibers embedded in the adhesive greatly increases and the flock density builds up rapidly.

With the third, or electrostatic process, the lines of force of an electrostatic field are used to propel and guide the fibers in their flight from the hopper to the adhesively coated substrate. This longitudinal alignment in flight causes the flocked fibers to impinge on the adhesive in an end on or erect orientation with respect to the adhesively coated substrate.

Substrate

The substrate employed in the practice of the present invention may be any type of material suitable for a flocking operation, such as, for example, woven or nonwoven fabric, knitted goods composed of at least one of cotton, viscose rayon, cellulosic acetate fibers, polyester fibers, polyamide fibers and the like, foamed or unfoamed plastics, paper, and the like. In addition, rigid backings such as for example, masonite, wood, glass, metals, fiberglass laminates, and the like may suitably be employed as substrate. The exact construction and weight of the substrate employed may vary widely, depending upon the particular characteristics desired in the product flocked article.

Adhesives

Various polymeric materials may be utilized to adhesively bind the flocked fibers to the substrate, and many such adhesive compositions are commercially available and well known to those of skill in the flocking art. Such adhesives are generally classified as water base, solvent base, or curable liquid systems.

Water base adhesives consist of a binder, an emulsion polymer, and a viscosity builder. Such adhesives may also contain plasticizers, thermosetting resins, curing catalysts, stabilizers, and other additives as are well known in the art.

The emulsion polymers generally used in the flocking art include acrylic, vinyl-acrylic, vinyl, urethane and styrene-butadiene latexes. In order that the flock be held in a desired position until the adhesive is fully cured, it is generally necessary to raise the viscosity of the latex to about 300 to about 300,000 centipoise (cp). The viscosity is dictated by the particular substrate backing being used for the deposition of flock and the specific adhesive employed. Particularly useful emulsion polymers are acrylic copolymers obtained directly by free radical initiated polymerization of a dispersed mixture of suitable acrylic monomers. Emulsion copolymers can be made from mixtures of 2, 3 or more reactive monomers in almost any proportion, and the number of possible products is therefore, very great. Suitable monomers for use in the preparation of emulsion copolymers include, but are not limited to, ethyl acrylate, butyl acrylate, methyl methacrylate, acrylic acid, methacrylic acid, acrylonitrile, methylol acrylamide, hydroxyethyl acrylate, vinyl acetate, styrene, and the like. In most cases, the monomers enter the polymer chain in a more or less random sequence. The total number of monomer units incorporated into each polymer chain may range from as few as about fifty up to several hundred and greater.

Suitable thickeners of use to build the viscosity of water base adhesives include water soluble polymers such as for example, carboxymethyl cellulose, hydroxyethyl cellulose, polyoxyethlenes and natural gums, as well as alkali swellable polymers such as for example, highly carboxylated acrylic emulsion polymers, etc.

Plasticizers may be added to alter the hand of the finished article or to improve the flow and leveling characteristics of the adhesive. Where the primary goal is the latter, fugitive plasticizers, such as for example, the phthalate esters, may be employed.

Thermosetting resins such as for example, methylolmelamines, urea formaldehyde condensates or phenol formaldehyde condensates may be incorporated to improve the durability or abrasion resistance of the finished article.

Catalysts such as for example, oxalic acid and diammonium phosphate can be used if desired to increase the rate of cure of the adhesive.

Solvent adhesives include both fully reacted soluble polymers, such as for example acrylic homo and copolymers, polyesters, polyamides, or polyurethanes and two package systems, such as for example, polyester polyols with diisocyanates or isocyanate prepolymer and epoxies with polyamines. The polymer or prepolymer is dissolved in a suitable solvent which is preferably low boiling, and then thickened to the proper viscosity in a manner similar to that used for the water base adhesives. Catalysts, cross-linking agents, stabilizers, pigments, dyes, or the like may also be incorporated. Foaming agents can also be incorporated into the adhesive to reduce the amount of adhesive required while maintaining a desired thickness of the adhesive layer. A minimum thickness of the adhesive layer is desirable to provide for sufficient penetration of the flock into the adhesive, thereby enhancing flock adhesion to the substrate.

Curable liquid systems include two-part urethanes, e.g., a diisocyanate and a polymeric polyol, flexible epoxy systems, e.g., liquid epoxy resins or solutions of solid epoxy resins coreacted with polyamides or polyamines and dimercaptans and a polyene with a peroxide. Also, hot melts can be used, such as for example, polyethylene-vinyl acetate copolymer, polyethylene-ethyl acrylate copolymer, and plasticized polyvinylchloride in the form of a plastisol which can be heated to fuse and then cured.

Water based acrylic latexes are preferred as the adhesive material in the practice of the present invention for safety in handling and ready availability.

While the amount of adhesive appropriate for application to the substrate in the practice of the present invention can be readily determined by one skilled in the art, the following suggested values are given to provide additional guidance. Broadly, the amount of adhesive used (calculated as solid content) is about 50 up to about 200 g per square meter ($g/m^2$) of substrate. Preferably, about 60 to about 180 $g/m^2$ will be employed with amounts of adhesive of about 80 up to about 160 $g/m^2$ being most preferred. When the amount of adhesive employed is too small, it is difficult to secure the flock to the substrate in a stable fashion, while when the amount of adhesive employed is excessive, the feeling and the appearance of the product flocked article is poor.

Adhesion Improving Additive

Adhesion improving additives useful in the practice of the present invention are selected from the group consisting of compounds conforming to the formulae:

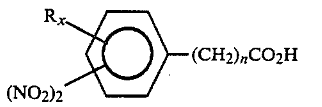
(I)

wherein R is a $C_1$ through $C_6$ alkyl or cycloalkyl radical or hydroxy group, n=0–5, inclusive and x=0–3, inclusive;

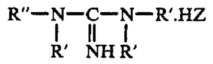
(II)

wherein each R′ is independently selected from hydrogen and $C_1$ through $C_6$ alkyl or cycloalkyl radical, R″ is either hydrogen or $—NR'_2$ wherein R′ is as defined above, and Z is $NO_3$ or $XO_4$ wherein X is a halogen; and mixtures of any two or more thereof.

Examples of compounds which satisfy the formula of Compound I include but are not limited to
2,4-Dinitrobenzoic acid
2,5-Dinitrobenzoic acid
3,4-Dinitrobenzoic acid
3,5-Dinitrosalicylic acid
2,4-Dinitrophenyl acetic acid
3-(2,4-Dinitrophenyl)propionic acid
4-(2,4-Dinitrophenyl)butyric acid
5-(2,4-Dinitrophenyl)pentanoic acid
6-Methyl-2,4-dinitrophenyl acetic acid
6-Ethyl-2,4-dinitrophenyl acetic acid
and the like and mixtures thereof.

Compounds which satisfy the formula of Compound II above include but are not limited to
Guanidine nitrate
Guanidine perchlorate
Aminoguanidine nitrate
Aminoguanidine perchlorate
N,N,N′,N′-Tetramethylaminoguanidine nitrate
N,N,N′,N′,N″-Pentamethylaminoguanidine nitrate
N,N,N′,N′-Tetraethylaminoguanidine nitrate
and the like and mixtures thereof.

Although there are no limits contemplated on the amounts of adhesion improving additive appropriate for use in the practice of the present invention, one would be advised to minimize exposure to these reagents for health and safety reasons. Therefore, an amount of adhesion improving additive ranging from about 0.1 up to about 5 wt. %, based on the total dry weight of adhesive (i.e. calculated as solid content) and adhesion improving additive is generally employed. Preferably, from about 0.2 up to about 3 wt. % adhesion improving inhibitor, calculated on the same basis as used above, will be employed.

The adhesive and at least one adhesion improving additive are intimately contacted by any suitable means as known to those of skill in the art. Thus, blending, shaking, stirring, mixing and the like are representative techniques which may be employed for the contacting of adhesive and adhesion improving additive. Once suitably mixed, the adhesive containing at least one adhesion improving additive can be applied to the substrate by any suitable process as known by those of skill in the art, such as for example, knife coating, roller coating, and the like.

EXAMPLE I

This example illustrates the procedure used to evaluate the adhesion promoters disclosed herein. An acrylic latex adhesive (100 grams of Polyflox 615, an aqueous polymer emulsion based on acrylonitrile/formaldehyde/ammonia, having a boiling point of about 212° F., specific gravity of 1.04–1.08, pH of 8.5–9.5, vapor pressure of about 24 mm Hg at 25° C., containing 54–56% volatiles, and having a viscosity of about 11,000–20,000 cps as measured on a Brookfield RVF with a #6 spindle at 20 RPM and 25° C. from Polymer Industries, Greenville, S.C.) was placed in a regular Osterizer kitchen blender along with 0.5 grams of 2,4-dinitrophenyl acetic acid and mixed at the highest speed for 5 minutes. The mixture was then spread evenly on an 8 inch×12 inch piece of either cardboard or woven cotton duck fabric to a thickness of about 1 millimeter. Polypropylene flock (15 to 50 microns in diameter, about 0.25 inch in length available from Phillips Fibers Corporation) was then added to the surface by means of either a flocking gun or sieve. The excess flock was removed by simply turning the sample upside down and gently shaking. The flocked-adhesive-substrate was dried (cured) for 15 minutes in an oven at 265° F. (129° C.), removed and cooled to ambient room temperature. Upon cooling after curing, loose flocks were removed by shaking and blowing with compressed air. Adhesion was judged by scratching the flocked surface with a fingernail. The adhered flock could not be removed and, thus, it was determined that 0.5 weight percent 2,4-dinitrophenyl acetic acid significantly improves adhesion. The test was repeated at 1.0 and 2.0 weight percent 2,4-dinitrophenyl acetic acid with equal success.

In a similar manner, aminoguanidine nitrate was evaluated and found to impart good adhesion characteristics to the acrylic latex-polypropylene flock. These results are shown in Table I.

TABLE I

Effect of Acrylic Latex Adhesion Promoters on Polypropylene Flocking
Acrylic Latex Adhesive-Polyflox 615

| Adhesion Promoter | Results |
|---|---|
| 1. None (Control) | Poor |
| Invention: | |
| 2. 2,4-Dinitrophenyl Acetic Acid | |
| a. 0.5% | Very Good |
| b. 1.0% | Very Good |
| c. 2.0% | Very Good |
| 3. Aminoguanidine Nitrate | |
| a. 0.5% | Good |
| b. 1.0% | Good |
| c. 2.0% | Good |

EXAMPLE II

This example illustrates the procedure used to pretreat flock fibers used in the practice of the present invention. Flocks were added to jars containing 5% aqueous solutions of various oxidizers and agitated until all flock fibers were well dispersed. After about 5 minutes the flocks were filtered and dried for about 2 hours in a circulating air oven at about 60° C.

An adhesive coated substrate was then flocked as described in Example I, then tested for adhesion by scratching the flocked surface with a fingernail. Results are shown in Table II.

TABLE II

| Effect of Oxidative Pre-Treatment on Polypropylene Flock Adhesion | |
|---|---|
| Oxidizing Pre-treatment | Results |
| None (control) | Poor |
| Oxone (DuPont) | Fair |
| $Zn(NO_3)_2 \cdot 6H_2O$ | Good |
| $KBrO_3$ | Very Good |

The use of oxidizing pre-treatment is thus seen to enhance the adhesion between flock fibers and adhesive. When adhesive containing at least one of the adhesion improving additives of the present invention is used instead of commercially available acrylic latex adhesive (such as Polyflox 615), excellent adhesion is achieved with any of the above oxidatively pre-treated fibers.

The examples have been provided merely to illustrate the practice of my invention and should not be read so as to limit the scope of my invention or the appended claims in any way. Reasonable variations and modifications, not departing from the essence and spirit of my invention, are contemplated to be within the scope of patent protection desired and sought.

I claim:

1. In a method for forming a flocked article which comprises flocking an adhesive coated substrate with short fibers, wherein said adhesive is formed from a polymer selected from one of the groups consisting of (a) acrylic, vinyl-acrylic, vinyl, urethane and styrene-butadiene latexes, (b) acrylic homo and copolymers, polyesters, polyamides, polyurethanes, polyester polyols with diisocyanates, isocyanate prepolymer with polyamine, and epoxies with polyamines; and (c) diisocyanate and a polymeric polyol, epoxy resins and polyamides, epoxy resins and dimercaptans, epoxy resins and polyamines, polyenes and a peroxide, polyethylene-vinyl acetate copolymer, polyethylene-ethyl acrylate copolymer, and plasticized polyvinylchloride, the improvement comprises adding to the adhesive at least one adhesion improving additive selected from the group consisting of compounds conforming to the formulae:

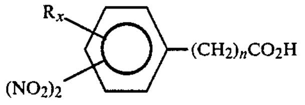

wherein R is a $C_1$ through $C_6$ alkyl or cycloalkyl radical or hydroxy group, n=0–5, inclusive and x=0–3, inclusive;

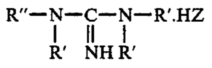

wherein each R′ is independently selected from hydrogen and $C_1$ through $C_6$ alkyl or cycloalkyl radical, R″ is either hydrogen or $—NR'_2$ wherein R′ is as defined above, and Z is $NO_3$ or $XO_4$ wherein X is a halogen; and mixtures of any two or more thereof.

2. A method in accordance with claim 1 wherein said adhesive is formed from an acrylonitrile/formaldehyde/ammonia aqueous polymer emulsion.

3. A method in accordance with claim 1 further comprising treating said flocked article for sufficient time and at sufficient temperature to substantially remove the water from the latex.

4. A method in accordance with claim 3 wherein said temperature does not exceed the softening point of said flock.

5. A method in accordance with claim 1 further comprising treating said supported flock at about 100° up to about 300° F. for about 1 to about 60 minutes.

6. A method in accordance with claim 1 wherein said adhesion improving additive is 2,4-dinitrophenyl acetic acid.

7. A method in accordance with claim 1 wherein said adhesion improving additive is aminoguanidine nitrate.

8. A method in accordance with claim 1 wherein said adhesion improving additive is aminoguanidine perchlorate.

9. A method in accordance with claim 1 wherein said adhesion promoting additive is present in an amount ranging from about 0.1 to about 5 weight percent based on the total dry weight of latex adhesive plus adhesion improving additive.

10. A method in accordance with claim 1 wherein said flock is a polyolefin flock prepared from olefins containing about 2 to about 8 carbon atoms.

11. A method in accordance with claim 10 wherein said polyolefin flock is a polypropylene flock.

12. A method in accordance with claim 10 wherein said polyolefin flock is subjected to an oxidizing pretreatment prior to contacting said coated surface.

13. An article of manufacture comprising:

(a) a substrate, (b) adhesive thereon, and (c) flock adhered to said adhesive; wherein said adhesive is formed from a polymer selected from one of the groups consisting of (a) acrylic, vinyl-acrylic, vinyl, urethane and styrene-butadiene latexes, (b) acrylic homo and copolymers, polyesters, polyamides, polyurethanes, polyester polyols with diisocyanates, isocyanate prepolymer with polyamine, an epoxies with polyamines; and (c) diisocyanate and a poymeric polyol, epoxy resins and polyamides, epoxy resins and dimercaptans, epoxy resins and polyamines, polyenes and a peroxide, polyethylene-vinyl acetate copolymer, polyethylene-ethyl acrylate copolymer, and plasticized polyvinylchloride; and wherein said adhesive contains at least one adhesive improving additive selected from the group consisting of compounds conforming to the formulae:

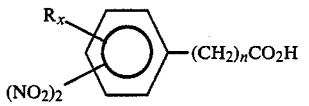

wherein R is a $C_1$ through $C_6$ alkyl or cycloalkyl radical or hydroxy group, n=0–5, inclusive and x=0–3, inclusive;

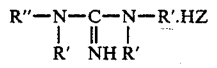

wherein each R′ is independently selected from hydrogen and $C_1$ through $C_6$ alkyl or cycloalkyl radical, R″ is either hydrogen or —$NR'_2$ wherein R' is as defined above, and Z is $NO_3$ or $XO_4$ wherein X is a halogen; and mixtures of any two or more thereof.

14. An article in accordance with claim 13 wherein said flock is a polyolefin flock prepared from olefins containing about 2 to about 8 carbon atoms.

15. An article in accordance with claim 14 wherein said adhesion improving additive is 2,4-dinitrophenyl acetic acid.

16. An article in accordance with claim 14 wherein said adhesion improving additive is aminoguanidine nitrate.

17. An article in accordance with claim 14 wherein said adhesion improving additive is aminoguanidine perchlorate.

18. An article in accordance with claim 13 wherein said adhesive is formed from an acrylonitrile/formaldehyde/ammonia aqueous polymer emulsion.

19. A composition comprising an adhesive formed from a polymer selected from one of the groups consisting of (a) acrylic, vinyl-acrylic, vinyl, urethane and styrene-butadiene latexes, (b) acrylic homo and copolymers, polyesters, polyamides, polyurethanes, polyester polyols with diisocyanates, isocyanate prepolymer with polyamine, and epoxies with polyamines; and (c) diisocyanate and a polymeric polyol, epoxy resins and polyamides, epoxy resins and dimercaptans, epoxy resins and polyamines, polyenes and a peroxide, polyethylene-vinyl acetate copolymer, polyethylene-ethyl acrylate copolymer, and plasticized polyvinylchloride, and 0.1 to 5 wt. % of at least one adhesion improving additive, based on the total dry weight of adhesive plus adhesion improving additive, wherein said at least one adhesion improving additive is selected from the group consisting of compounds conforming to the formulae:

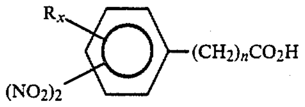

wherein R is a $C_1$ through $C_6$ alkyl or cycloalkyl radical or hydroxy group, n=0–5, inclusive and x=0–3, inclusive;

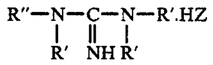

wherein each R' is independently selected from hydrogen and $C_1$ through $C_6$ alkyl or cycloalkyl radical, R'' is either hydrogen or —$NR'_2$ wherein R' is as defined above, and Z is $NO_3$ or $XO_4$ wherein X is a halogen; and mixtures of any two or more thereof.

20. A composition in accordance with claim 19 wherein said adhesion improving additive is 2,4-dinitrophenyl acetic acid.

21. A composition in accordance with claim 19 wherein said adhesion improving additive is aminoguanidine nitrate.

22. A composition in accordance with claim 19 wherein said adhesion improving additive is aminoguanidine perchlorate.

23. A composition in accordance with claim 19 wherein said adhesive is an acrylic latex adhesive.

24. A composition in accordance with claim 19 wherein said adhesive is formed from an acrylonitrile/-formaldehyde/ammonia aqueous polymer emulsion.

* * * * *